(12) United States Patent
Wu

(10) Patent No.: US 11,614,374 B2
(45) Date of Patent: Mar. 28, 2023

(54) DATA DISPLAY METHOD OF TEST INSTRUMENT FOR RIVET NUT SETTING TOOL

(71) Applicant: SOL AI TECHNOLOGY CO., LTD., Taoyuan (TW)

(72) Inventor: Sheng-Yuan Wu, Taoyuan (TW)

(73) Assignee: SOL AL TECHNOLOGY CO., LTD., Taoyuan (TW)

( * ) Notice: Subject to any disclaimer, the term of this patent is extended or adjusted under 35 U.S.C. 154(b) by 578 days.

(21) Appl. No.: 16/852,847

(22) Filed: Apr. 20, 2020

(65) Prior Publication Data
US 2021/0291255 A1     Sep. 23, 2021

(30) Foreign Application Priority Data
Mar. 19, 2020   (TW) ................................ 109109237

(51) Int. Cl.
| | |
|---|---|
| *G01L 5/00* | (2006.01) |
| *B21J 15/04* | (2006.01) |
| *B21J 15/28* | (2006.01) |
| *G01M 99/00* | (2011.01) |
| *G06F 3/14* | (2006.01) |
| *G06T 11/20* | (2006.01) |
| *G01L 25/00* | (2006.01) |

(52) U.S. Cl.
CPC ........... *G01L 5/0033* (2013.01); *B21J 15/043* (2013.01); *B21J 15/285* (2013.01); *G01M 99/005* (2013.01); *G01M 99/008* (2013.01); *G06F 3/14* (2013.01); *G06T 11/206* (2013.01); *G01L 5/00* (2013.01); *G01L 25/006* (2013.01)

(58) Field of Classification Search
CPC .... G01L 5/0033; G01L 25/006; B21J 15/043; B21J 15/285; G01M 99/005; G01M 99/008; G06F 3/14; G06T 11/206
See application file for complete search history.

(56) References Cited

U.S. PATENT DOCUMENTS

| | | | | |
|---|---|---|---|---|
| 5,508,718 A | * | 4/1996 | Haikin | ................... G06T 11/001 |
| | | | | 345/601 |
| 5,550,971 A | * | 8/1996 | Brunner | ............ G06F 16/24552 |
| 5,604,860 A | * | 2/1997 | McLaughlin | ........ G03G 15/502 |
| | | | | 715/810 |
| 5,611,059 A | * | 3/1997 | Benton | .............. G05B 19/0426 |
| | | | | 715/965 |
| 5,673,401 A | * | 9/1997 | Volk | ................. H04N 21/42204 |
| | | | | 348/E7.071 |
| 5,726,883 A | * | 3/1998 | Levine | ................. G03G 15/502 |
| | | | | 700/83 |

(Continued)

*Primary Examiner* — Nicholas Augustine
(74) *Attorney, Agent, or Firm* — Che-Yang Chen; Law Office of Michael Chen

(57) ABSTRACT

A data display method of a test instrument for a rivet nut setting tool is disclosed. When the rivet nut setting tool is operated, a value of a pull force detected by the pull-force detector is transmitted to the first display area through a circuit module, and a first display area displays variation of the value of the detected pull force in waveform, and the first display area also displays an upper-limit waveform value, a waveform data unit, a current value and a historical maximum value; when the rivet nut setting tool is operated continuously, the first display area displays a continuous waveform, and the second display area displays historical data and average values of maximum pull force values.

8 Claims, 18 Drawing Sheets

(56) References Cited

U.S. PATENT DOCUMENTS

| | | | | |
|---|---|---|---|---|
| 5,754,174 A * | 5/1998 | Carpenter | G06F 3/0481 | 715/810 |
| 5,832,496 A * | 11/1998 | Anand | G06F 16/986 | 707/E17.118 |
| 5,870,088 A * | 2/1999 | Washington | G06F 3/04847 | 707/999.102 |
| 5,956,024 A * | 9/1999 | Strickland | G06Q 30/02 | 715/717 |
| 6,014,138 A * | 1/2000 | Cain | G06F 8/24 | 715/744 |
| 6,137,485 A * | 10/2000 | Kawai | H04N 7/15 | 348/E7.083 |
| 6,144,962 A * | 11/2000 | Weinberg | H04L 9/40 | 714/E11.181 |
| 6,199,099 B1 * | 3/2001 | Gershman | G06F 16/9537 | 709/201 |
| 6,212,524 B1 * | 4/2001 | Weissman | G06F 16/283 | 707/769 |
| 6,222,540 B1 * | 4/2001 | Sacerdoti | G06F 16/248 | 345/440.1 |
| 6,275,225 B1 * | 8/2001 | Rangarajan | G06F 9/451 | 715/969 |
| 6,330,007 B1 * | 12/2001 | Isreal | G06F 8/38 | 715/764 |
| 6,353,446 B1 * | 3/2002 | Vaughn | H04L 41/22 | 715/733 |
| 6,356,905 B1 * | 3/2002 | Gershman | G06Q 30/0633 | 707/999.005 |
| 6,377,993 B1 * | 4/2002 | Brandt | G06Q 30/02 | 709/227 |
| 6,601,233 B1 * | 7/2003 | Underwood | G06F 8/24 | 717/102 |
| 6,621,508 B1 * | 9/2003 | Shiraishi | G06F 3/0481 | 715/764 |
| 6,643,661 B2 * | 11/2003 | Polizzi | G06F 16/972 | 707/711 |
| 6,668,253 B1 * | 12/2003 | Thompson | G06Q 10/06 | |
| 6,678,634 B1 * | 1/2004 | Wendt | B21B 38/04 | 702/170 |
| 6,714,219 B2 * | 3/2004 | Lindhorst | G06F 8/34 | 715/769 |
| 6,748,394 B2 * | 6/2004 | Shah | G06F 21/6227 | 707/999.102 |
| 6,757,681 B1 * | 6/2004 | Bertram | H04L 43/067 | 707/999.102 |
| 6,792,475 B1 * | 9/2004 | Arcuri | H04L 9/40 | 715/239 |
| 6,832,263 B2 * | 12/2004 | Polizzi | G06F 16/954 | 707/999.101 |
| 6,889,096 B2 * | 5/2005 | Spriggs | G06Q 9/451 | 705/28 |
| 6,895,409 B2 * | 5/2005 | Uluakar | G06F 8/20 | 717/121 |
| 6,918,091 B2 * | 7/2005 | Leavitt | G06F 9/451 | 715/779 |
| 6,941,311 B2 * | 9/2005 | Shah | G06F 16/24557 | 707/999.102 |
| 6,947,929 B2 * | 9/2005 | Bruce | G06F 16/24575 | 707/999.005 |
| 6,990,520 B2 * | 1/2006 | Green | H04L 41/0873 | 709/224 |
| 7,007,029 B1 * | 2/2006 | Chen | G06Q 30/00 | |
| 7,030,890 B1 * | 4/2006 | Jouet | G06F 9/451 | 345/589 |
| 7,043,311 B2 * | 5/2006 | Nixon | G05B 19/4188 | 705/401 |
| 7,228,187 B2 * | 6/2007 | Tich | G06Q 10/04 | 700/83 |
| 10,564,633 B2 * | 2/2020 | Asenjo | G06Q 10/06 | |
| 2002/0054141 A1 * | 5/2002 | Yen | G09G 5/14 | 715/804 |
| 2002/0095651 A1 * | 7/2002 | Kumar | H04L 67/567 | 707/E17.119 |
| 2002/0123915 A1 * | 9/2002 | Denning | G06Q 10/06 | 705/7.11 |
| 2002/0138158 A1 * | 9/2002 | Landreth | G05B 15/02 | 714/1 |
| 2002/0138527 A1 * | 9/2002 | Bell | G06Q 10/10 | 715/255 |
| 2002/0186257 A1 * | 12/2002 | Cadiz | G06F 16/9535 | 715/838 |
| 2003/0020671 A1 * | 1/2003 | Santoro | G09G 5/14 | 345/1.3 |
| 2003/0023468 A1 * | 1/2003 | Aurrichio | G06Q 10/10 | 705/7.38 |
| 2003/0030664 A1 * | 2/2003 | Parry | G06F 9/4411 | 715/744 |
| 2003/0052793 A1 * | 3/2003 | Gustason | G08B 21/0446 | 340/436 |
| 2003/0120711 A1 * | 6/2003 | Katz | H04L 67/75 | 718/106 |
| 2003/0164862 A1 * | 9/2003 | Cadiz | G06Q 10/107 | 715/838 |
| 2003/0233367 A1 * | 12/2003 | Uluakar | G06F 8/20 | 707/999.102 |
| 2004/0015783 A1 * | 1/2004 | Lennon | G06F 16/248 | 715/255 |
| 2004/0181543 A1 * | 9/2004 | Wu | G06F 16/90328 | 707/999.102 |
| 2004/0205287 A1 * | 10/2004 | Joder | G06Q 10/06 | 711/1 |
| 2004/0225955 A1 * | 11/2004 | Ly | G06Q 10/06 | 715/255 |
| 2005/0015745 A1 * | 1/2005 | Wain | G06F 8/34 | 717/109 |
| 2005/0022160 A1 * | 1/2005 | Uluakar | G06F 8/20 | 717/105 |
| 2005/0050095 A1 * | 3/2005 | Hurtis | G06Q 10/06 | |
| 2005/0069107 A1 * | 3/2005 | Tanaka | H04N 7/142 | 348/E7.079 |
| 2005/0071305 A1 * | 3/2005 | Hugh | G06F 16/30 | 706/45 |
| 2006/0020942 A1 * | 1/2006 | Ly | G06F 9/5027 | 718/100 |
| 2006/0156246 A1 * | 7/2006 | Williams | G06F 16/58 | 715/764 |
| 2008/0049949 A1 * | 2/2008 | Snider | H05K 9/0007 | 381/86 |
| 2008/0189638 A1 * | 8/2008 | Mody | G06F 9/451 | 715/771 |
| 2009/0089701 A1 * | 4/2009 | Baier | G06Q 10/06 | 715/772 |
| 2013/0113700 A1 * | 5/2013 | Nagai | G05B 19/41875 | 345/1.3 |
| 2013/0286187 A1 * | 10/2013 | Slesinski | B25F 5/021 | 353/121 |
| 2014/0279245 A1 * | 9/2014 | Callanta | G06Q 30/0623 | 705/26.61 |
| 2015/0106753 A1 * | 4/2015 | Tran | G05B 23/0272 | 715/765 |
| 2015/0251240 A1 * | 9/2015 | LeMieux | G05B 19/4063 | 700/110 |
| 2016/0071340 A1 * | 3/2016 | Kauth | G07C 9/20 | 340/5.2 |
| 2016/0144466 A1 * | 5/2016 | Simonet | B21J 15/04 | 29/505 |
| 2016/0259313 A1 * | 9/2016 | Liu | G06F 3/0484 | |
| 2016/0292925 A1 * | 10/2016 | Montgomerie | H04L 65/75 | |
| 2017/0357426 A1 * | 12/2017 | Wilson | G06F 3/04847 | |
| 2017/0357427 A1 * | 12/2017 | Wilson | G06F 3/0487 | |
| 2018/0130260 A1 * | 5/2018 | Schmirler | G06F 3/011 | |
| 2018/0131907 A1 * | 5/2018 | Schmirler | H04N 5/23238 | |
| 2020/0122224 A1 * | 4/2020 | Wu | B21J 15/50 | |
| 2020/0285939 A1 * | 9/2020 | Baker | G06N 3/063 | |
| 2021/0291256 A1 * | 9/2021 | Zhao | B25J 19/0091 | |

* cited by examiner

DATA DISPLAY METHOD OF TEST INSTRUMENT FOR RIVET NUT SETTING TOOL

BACKGROUND OF THE INVENTION

1. Field of the Invention

The present invention relates to a data display method of a test instrument, and the test instrument is used to test a pull force of a rivet nut setting tool in use.

2. Description of the Related Art

When a rivet nut is set, a pulling force is required to rivet the rivet nut to a target position, and in order to quickly and easily set the rivet nut, a variety of rivet nut setting tools have appeared on the market; for example, Taiwan Patent Issue No. M536107 "rivet nut assembling tool", and Taiwan Patent Issue No. 1337905 "rivet nut machine". Different types or sizes of rivet nuts have different suitable pulling force range for setting, and parts of the rivet nut setting tool are inevitably worn under long-term use, and it causes reduction of the pull force and failure to set the rivet nut smoothly. This condition is often found when the rivet nut cannot be set smoothly during construction, or when the thread of the rivet nut is damaged during setting because of excessive pull force of the rivet nut setting tool. Although the rivet nut setting tool on the market generally has the function of adjusting pull force, in practice, the same type of rivet nut setting tools still have different performance due to the difference in component size or the quality of the assembly process level when the rivet nut setting tools are delivered from factory; or, the adjusted pull force is not certainly correct because the components of the rivet nut setting tool are worn after long-term use, for example, the rivet nut setting tool is adjusted to decrease pull force by 10 Kgf of scale, but the pull force is actually decreased by 7 Kgf only because of tolerances or wear; or the pneumatic rivet nut setting tool is inputted with a specific air pressure value to set a rivet nut of a certain size, but the pneumatic rivet nut setting tool still has different pull force performances even if the input values are the same due to tolerance or wear.

Therefore, in order to solve this problem, a pull test instrument for testing the rivet nut setting tool is provided in market; however, the conventional pull test instruments can provide the user to observe a single test value only, and a maximum tensile value only is displayed. During the test process, the test time usually does not exceed 1 second, so the rapid change of data of the pull force from zero to thousands of Kgf cannot be directly observed directly with the user's naked eye. Generally, the pull force of the rivet nut setting tool is measured by multiple times to avoid misjudgment, the conventional test instrument that can only allow the user to observe a single value is inconvenient for the user in determining values of continuous operations because the user still needs paper and pen or the user's own memory to record the data.

SUMMARY OF THE INVENTION

The present invention relates to a data display method of a test instrument, and the data display method can continuously display values of pull forces and an average value of pull forces of many operations of the rivet nut setting tool, so that it is not necessary for a user to record and calculate data by paper and pen anymore, and the test time can be reduced significantly; furthermore, the full waveform can be displayed in curve diagram and the variation of the pull force can be recorded during each test process, thereby facilitating to diagnose abnormal condition of the rivet nut setting tool.

In order to achieve the aforementioned objective and effect, the present invention provides a data display method of a test instrument for a rivet nut setting tool, and the test instrument includes a shell body, a pull-force detector, a circuit module, a first display area and a second display area. The pull-force detector, the circuit module, the first display area and the second display area are disposed in the shell body, and the pull-force detector, the first display area and the second display area are electrically connected to the circuit module, and the rivet nut setting tool is disposed on the pull-force detector. When the rivet nut setting tool is operated, a value of a pull force detected by the pull-force detector is integrated and transmitted to the first display area by the circuit module, and the first display area displays variation of the values of the pull force detected by the pull-force detector in waveform, and the first display area also displays an upper-limit waveform value, a waveform data unit, a current value and a historical maximum value, wherein when the rivet nut setting tool is continuously operated, the first display area displays a continuous waveform curve, and the second display area displays historical data and average values of maximum pull force values during operations of the rivet nut setting tool, sequentially.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1A:
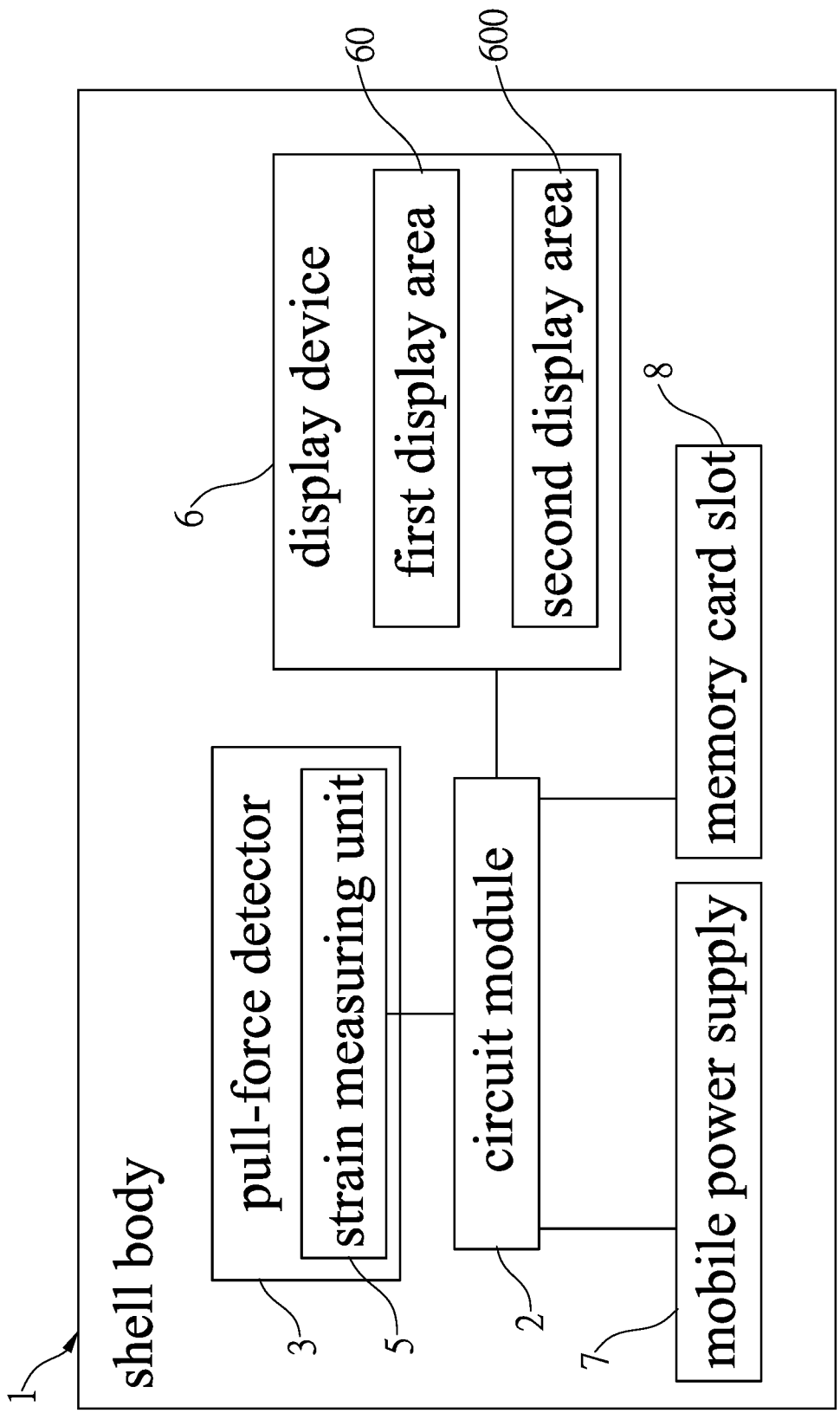
FIG. 1A is a structural view of a test instrument having single display device, according to the present invention.
Figure 1B:
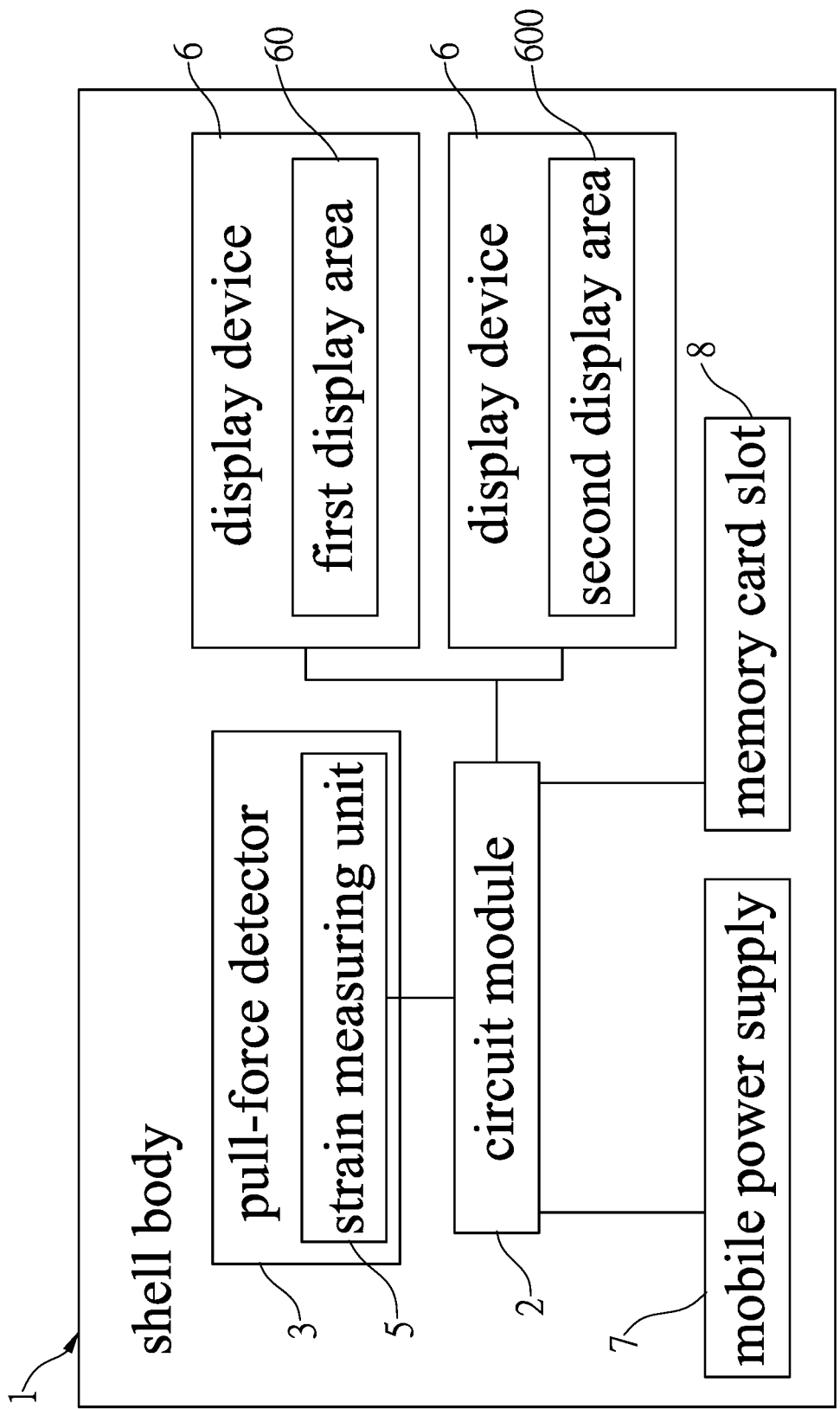
FIG. 1B is a structural view of a test instrument having a plurality of display devices, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

Please refer to FIGS. 1A to 6, which show a test instrument using a data display method of the present invention. As shown in FIGS. 1A to 6, the test instrument includes a shell body 1, a pull-force detector 3, a circuit module 2, a first display area 60 and a second display area 600. The pull-force detector 3, the circuit module 2, the first display area 60 and the second display area 600 are disposed in the shell body 1, and the pull-force detector 3, the first display area 60 and the second display area 600 are electrically connected to the circuit module 2. The rivet nut setting tool 100 is mounted with the pull-force detector 3. When the rivet nut setting tool 100 is operated, a value of a pull force detected by the pull-force detector 3 is integrated and transmitted to the first display area 60 by the circuit module 2, and the first display area 60 can display variation of values of the pull forces detected by the pull-force detector 3 in a waveform, and the first display area 60 also displays an upper-limit waveform value 62, a waveform data unit 61, a current value 63 and a historical maximum value 64. When the rivet nut setting tool 100 is operated continuously, the first display area 60 displays a continuous waveform curve and the second display area 600 displays historical data 601 and an average value 602 of the maximum pull force values during operations of the rivet nut setting tool 100, in sequential order.

The first display area 60 and the second display area 600 can be displayed on a display device 6, or respectively displayed on multiple display devices 6.

Figure 3:
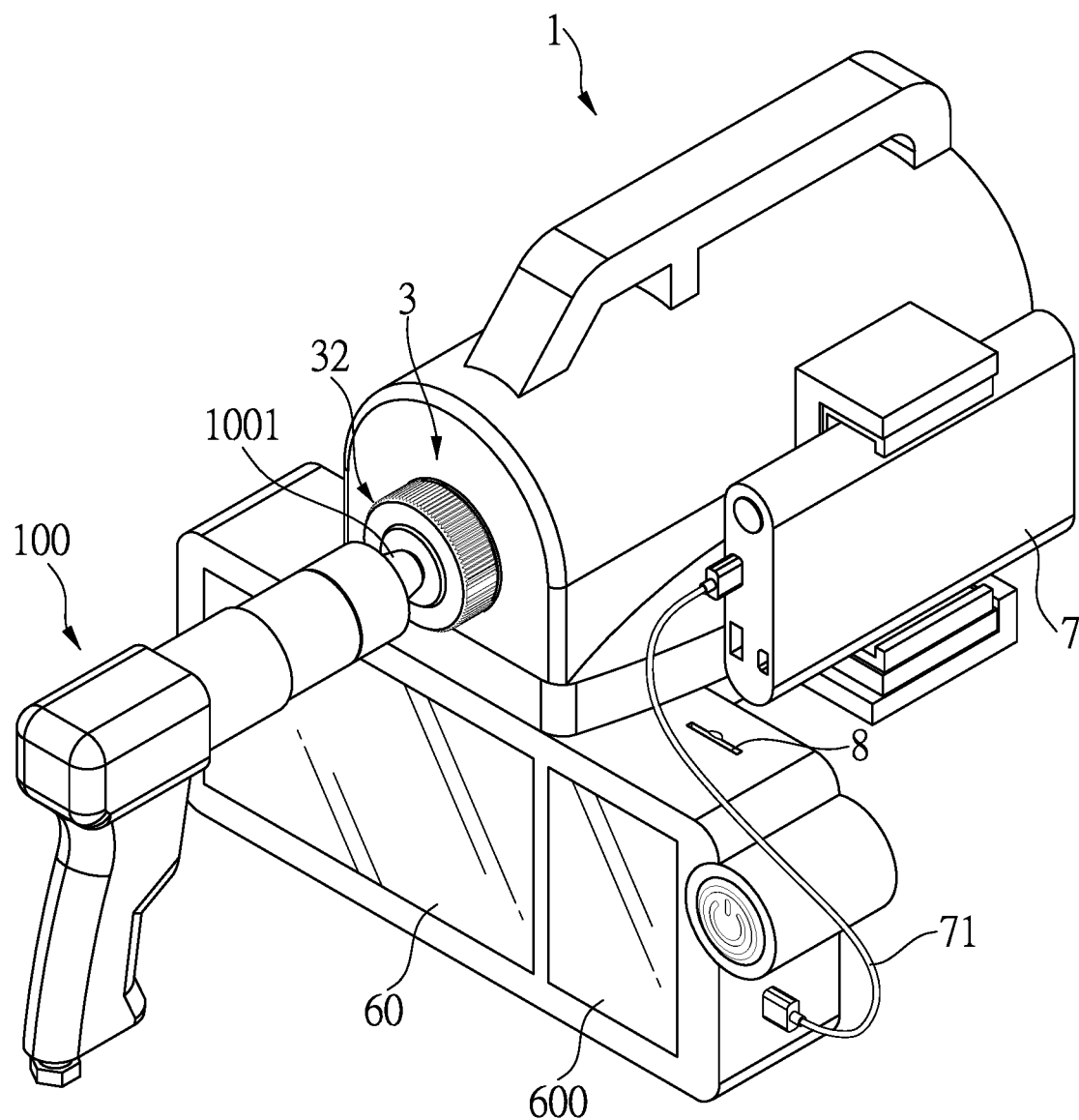
FIG. 3 is a schematic view of a pull-force detector mounted with a rivet nut setting tool, according to the present invention.
Figure 4:
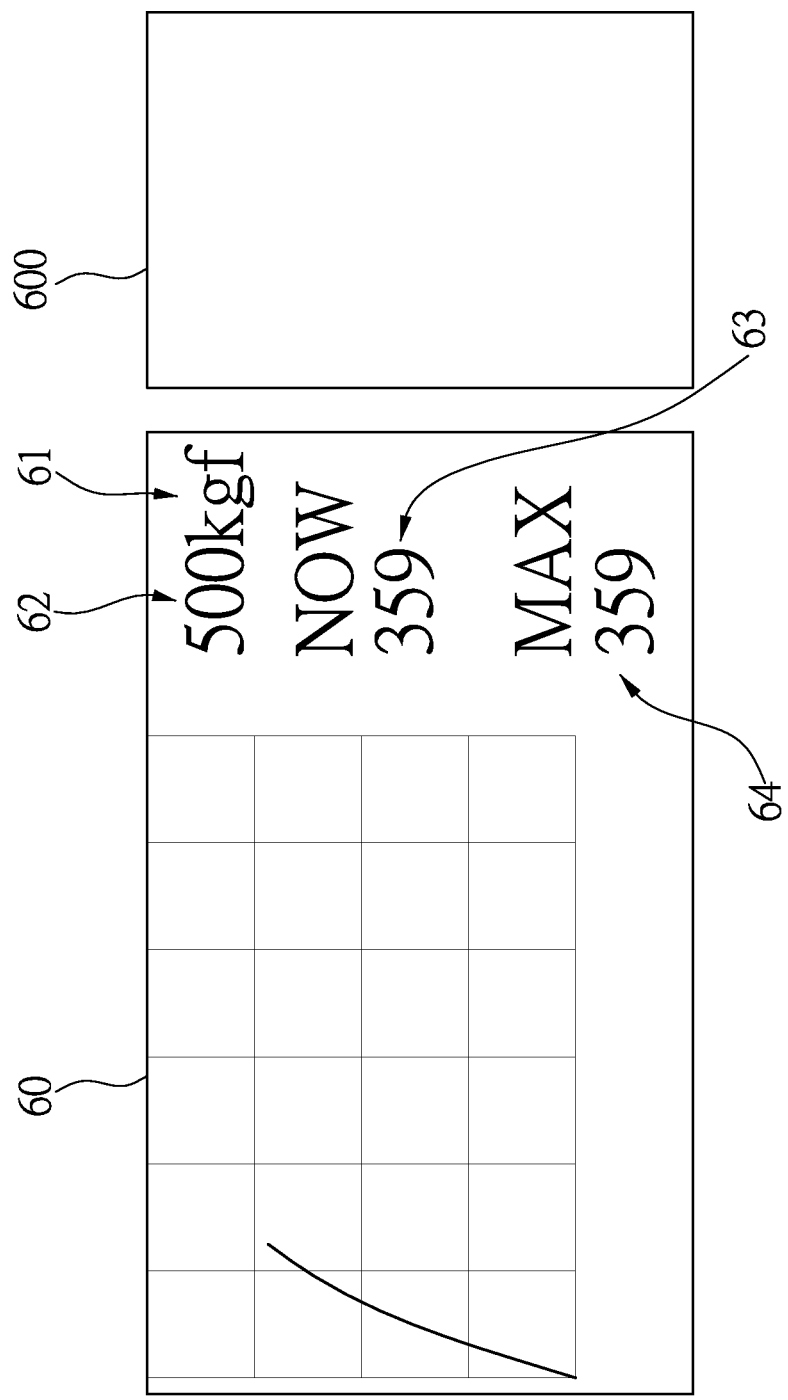
FIG. 4 is a schematic view of a first display area displaying waveform when a rivet nut setting tool is operated, according to the present invention.
Figure 5:
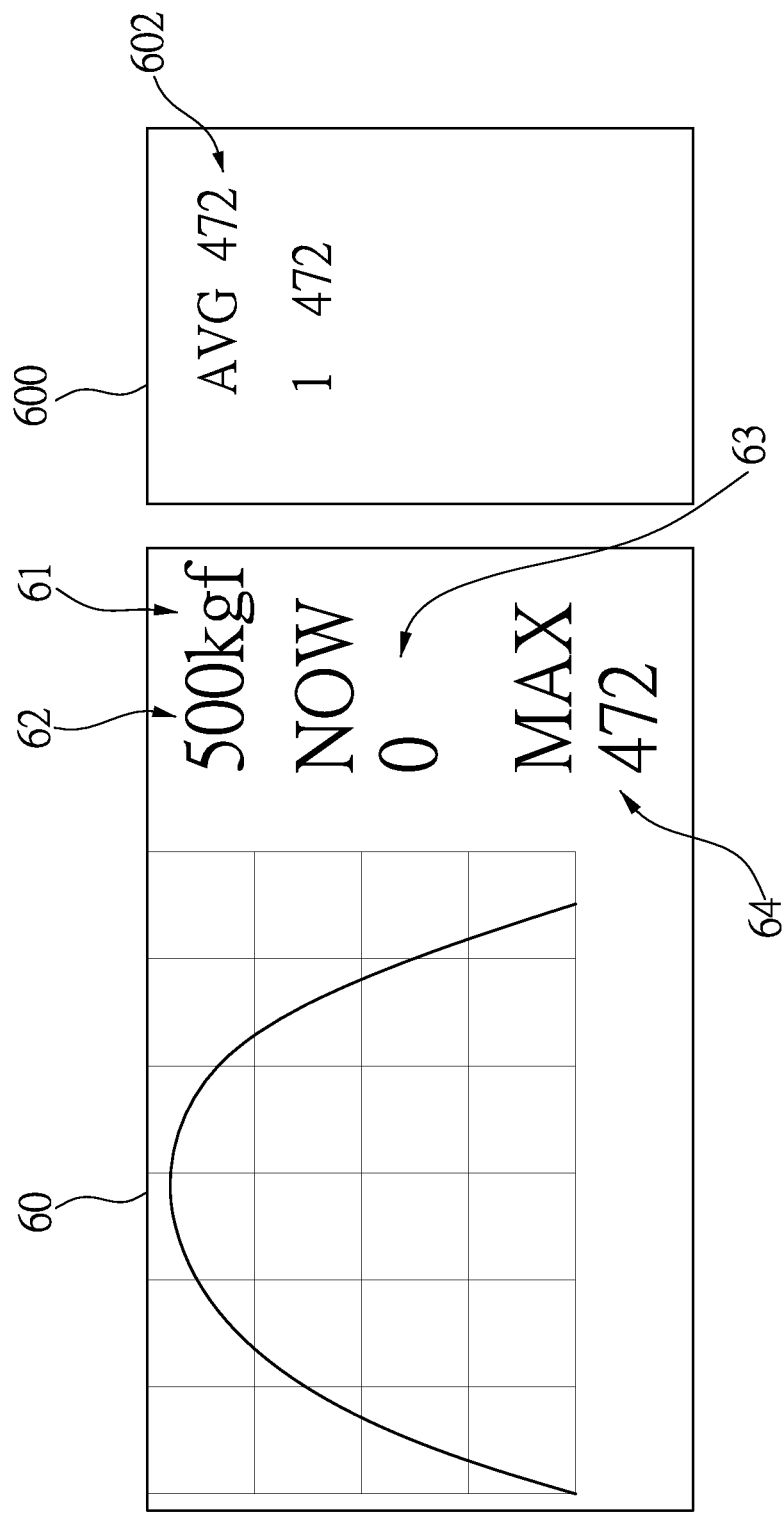
FIG. 5 is a schematic view of a first display area displaying full waveform.
Figure 6:
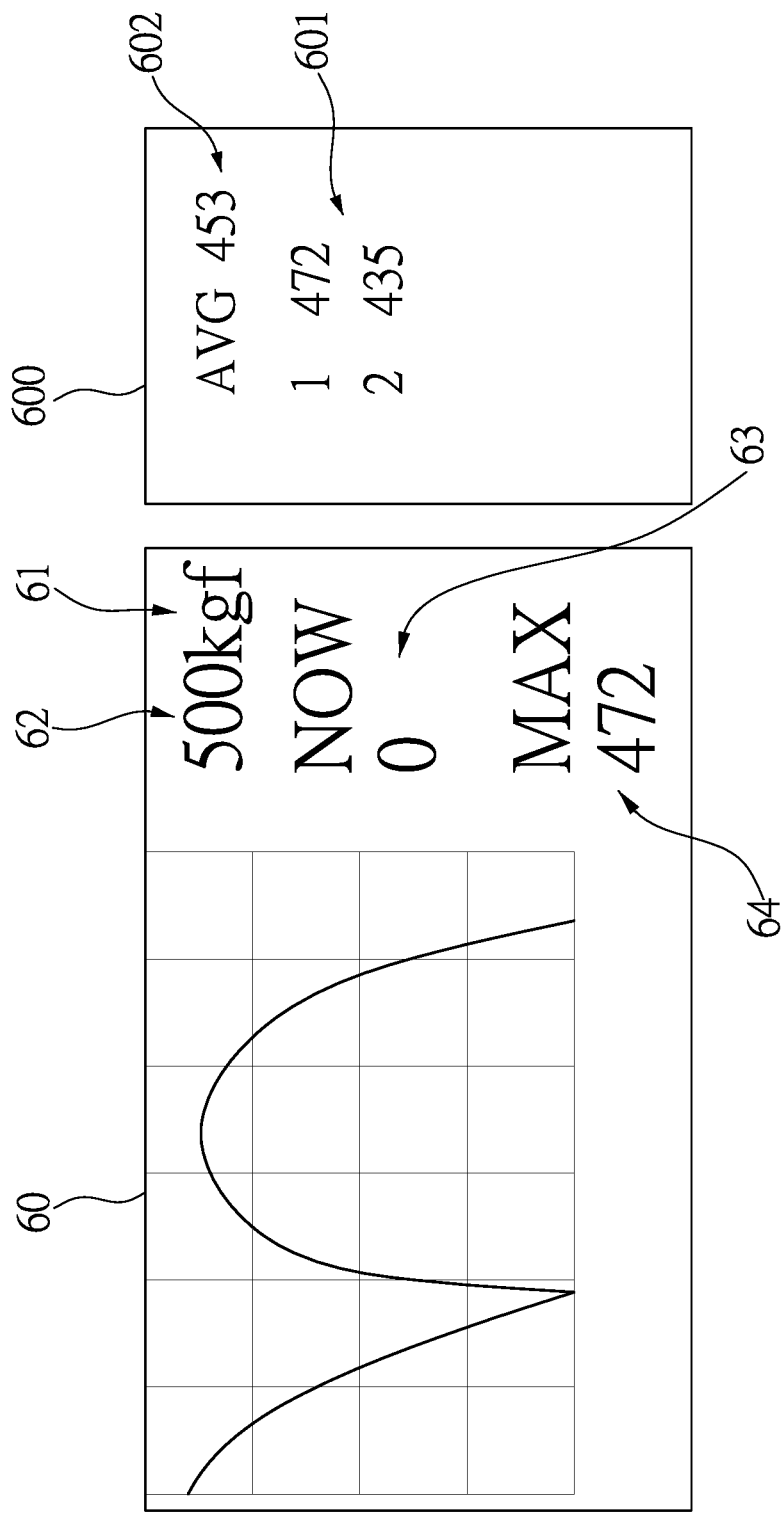
FIG. 6 is a schematic view of a first display area displaying continuous waveform when a rivet nut setting tool is continuously operated, according to the present invention.

As shown in FIG. 3, the rivet nut setting tool 100 can be mounted with the pull-force detector 3 to start measuring, and after the pull-force detector 3 (in this embodiment, a strain gauge pull-force detector is taken as an example of the pull-force detector 3) starts to deform during operation of the rivet nut setting tool 100, the value of the signal is varied in response to deformation, and the circuit module 2 integrates the signal to display on the first display area 60 in waveform, as shown in FIG. 4. The first display area 60 also displays the waveform data unit 61 (Kgf shown in FIG. 3 is a unit of force and taken as an example of the waveform data unit 61), an upper-limit waveform value 62, a current value 63, a historical maximum value 64. As shown in FIG. 5, after one operation of the rivet nut setting tool 100 is completely, the full waveform is displayed and the second display area 600 records a maximum pull force value of this operation. When the rivet nut setting tool 100 is continuously operated, continuous waveform is displayed, as shown in FIG. 6, and at the same time, the screen of the second display area 600 also continuously records historical data 601 and an average value 602 of the maximum pull force values during multiple operations, and the older waveform continuously fades out in the left side.

According to above-mentioned contents, the data display method of the present invention can display the variation of the measured values in waveform, and display continuous waveform in the first display area 60 and record the historical data 601 in the second display area 600 when the rivet nut setting tool 100 is continuously operated, so that it is not necessary for a user to determine and record these values by paper and pen or the user's own memory, thereby completely solving the conventional problem; furthermore, a professional person can just view the waveform curve to know whether there is an problem with the rivet nut setting tool, so as to significantly increase convenience in diagnosis of the abnormal condition of the rivet nut setting tool 100.

Figure 7:
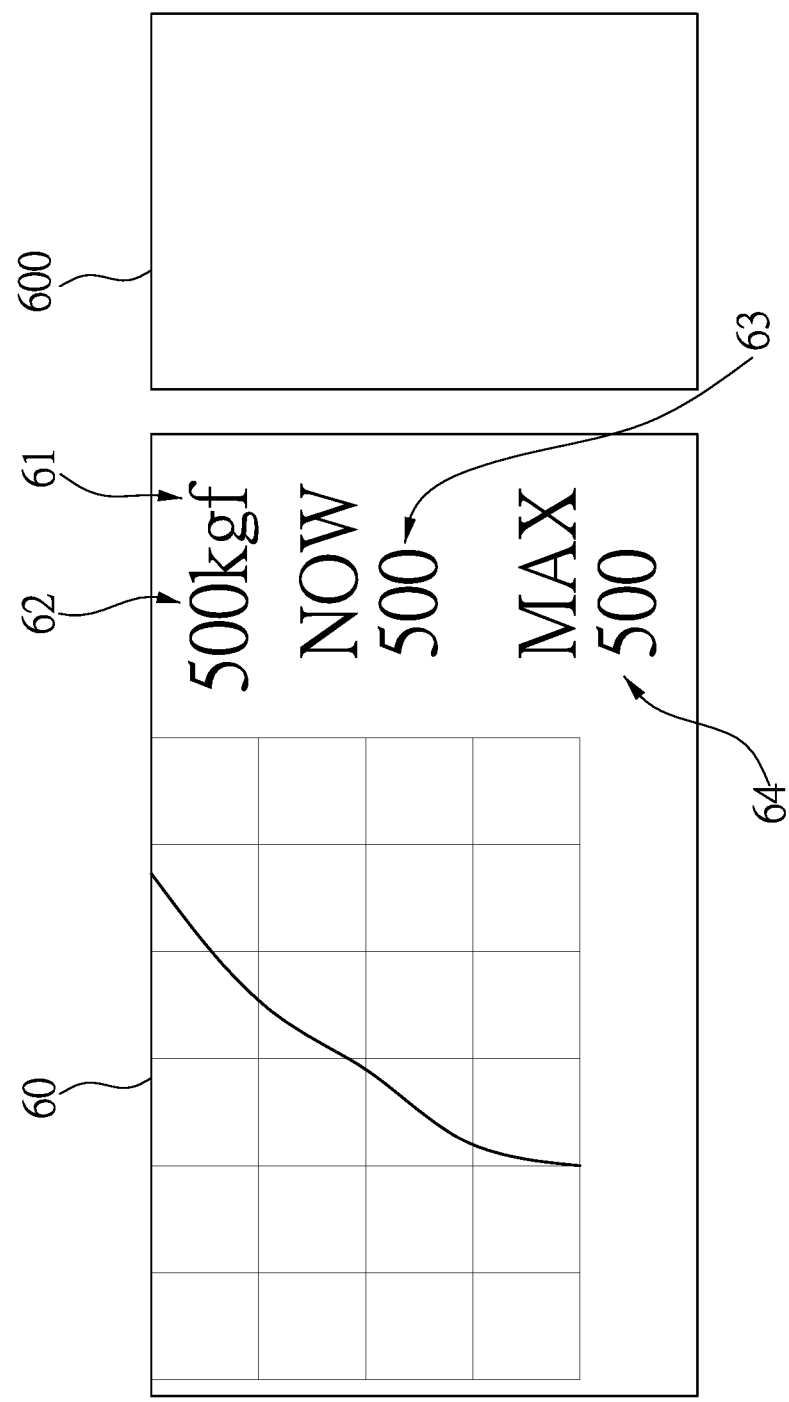
FIG. 7 is a schematic view of the pull force reaching a current upper-limit waveform value when the rivet nut setting tool is operated, according to the present invention.
Figure 8:
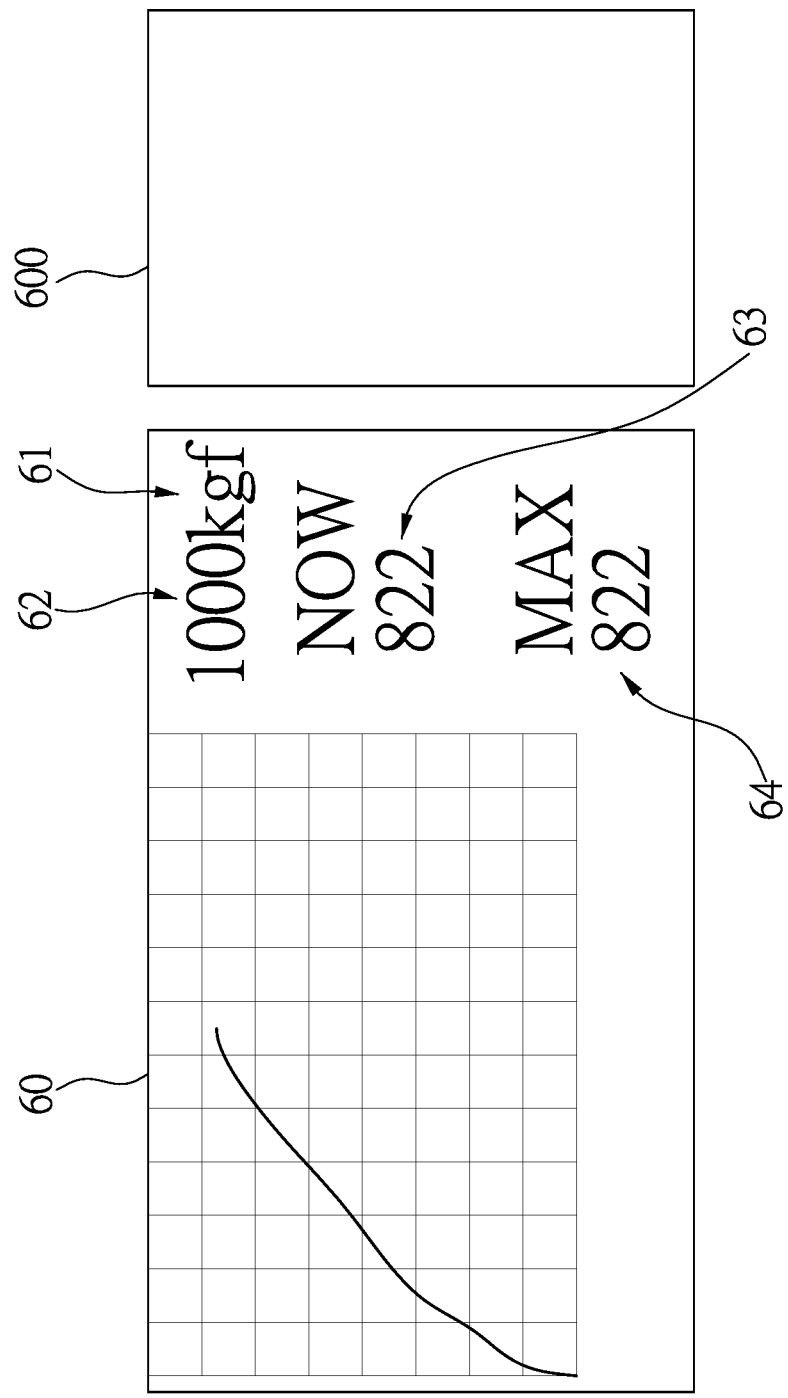
FIG. 8 is a schematic view of an operation of switching an upper-limit waveform value from 500 Kgf up to 1000 Kgf, according to the present invention.
Figure 9:
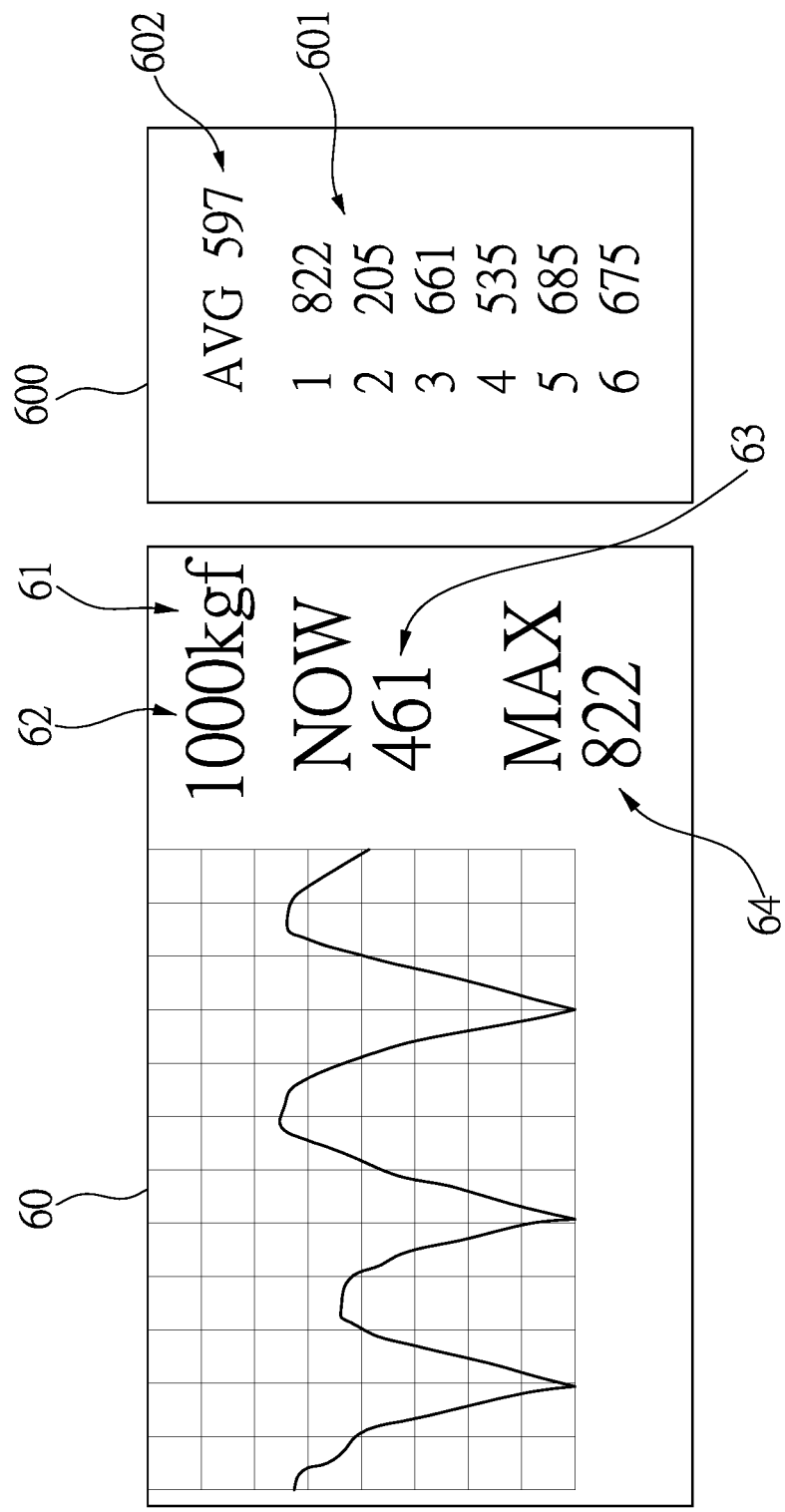
FIG. 9 is a schematic view of waveform with the 1000 Kgf of an upper-limit waveform value, according to the present invention.

During operation of the rivet nut setting tool, when the value of the pull force generated by the pull-force detector 3 and integrated by the circuit module 2 exceeds an upper-limit waveform value 62 currently displayed on the first display area, the circuit module 2 changes the upper-limit waveform value 62 currently displayed on the first display area, to make the first display area 60 display the full waveform curve, as shown in FIGS. 7 and 8, for example, the upper-limit waveform value 62 can be increased from 500 Kgf up to 1000 Kgf, so that the full waveform with higher value can be displayed because of increasing of the upper-limit waveform value 62, as shown in FIG. 9.

Figure 10:
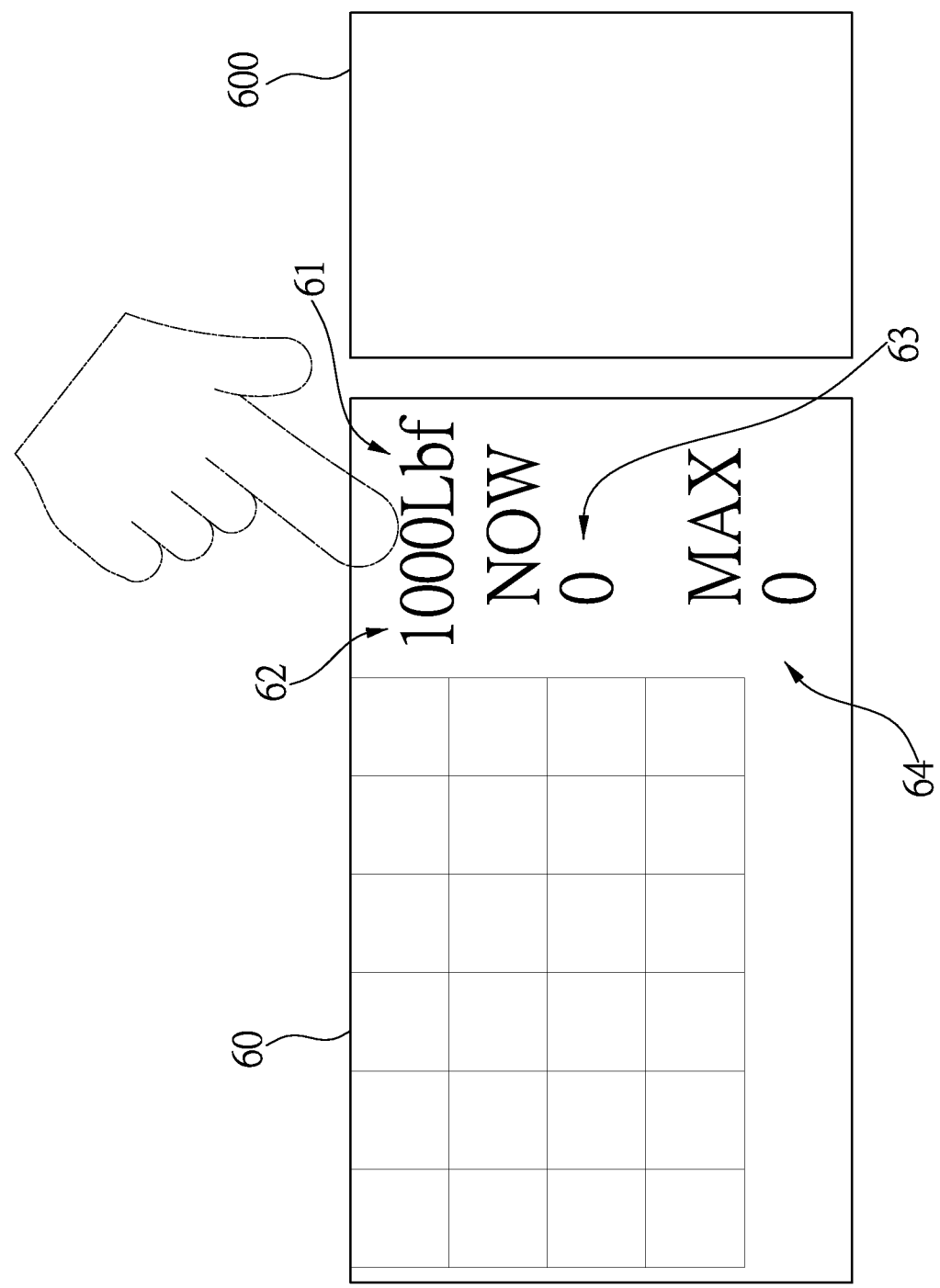
FIG. 10 is a schematic view of an operation of touching a first display area to switch a waveform data unit by hand, according to the present invention.
Figure 11:
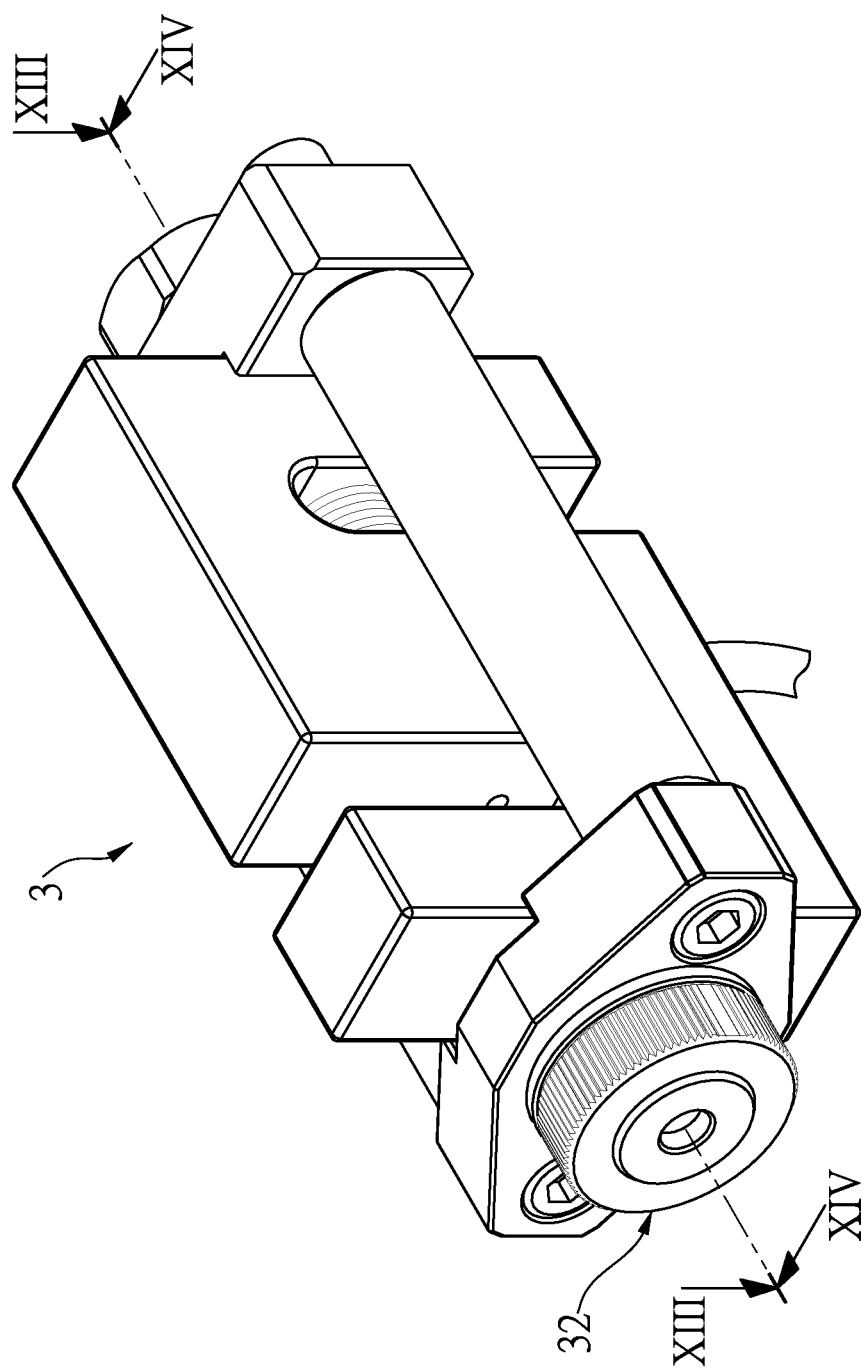
FIG. 11 is a perspective view of a pull-force detector according to the present invention.
Figure 12:
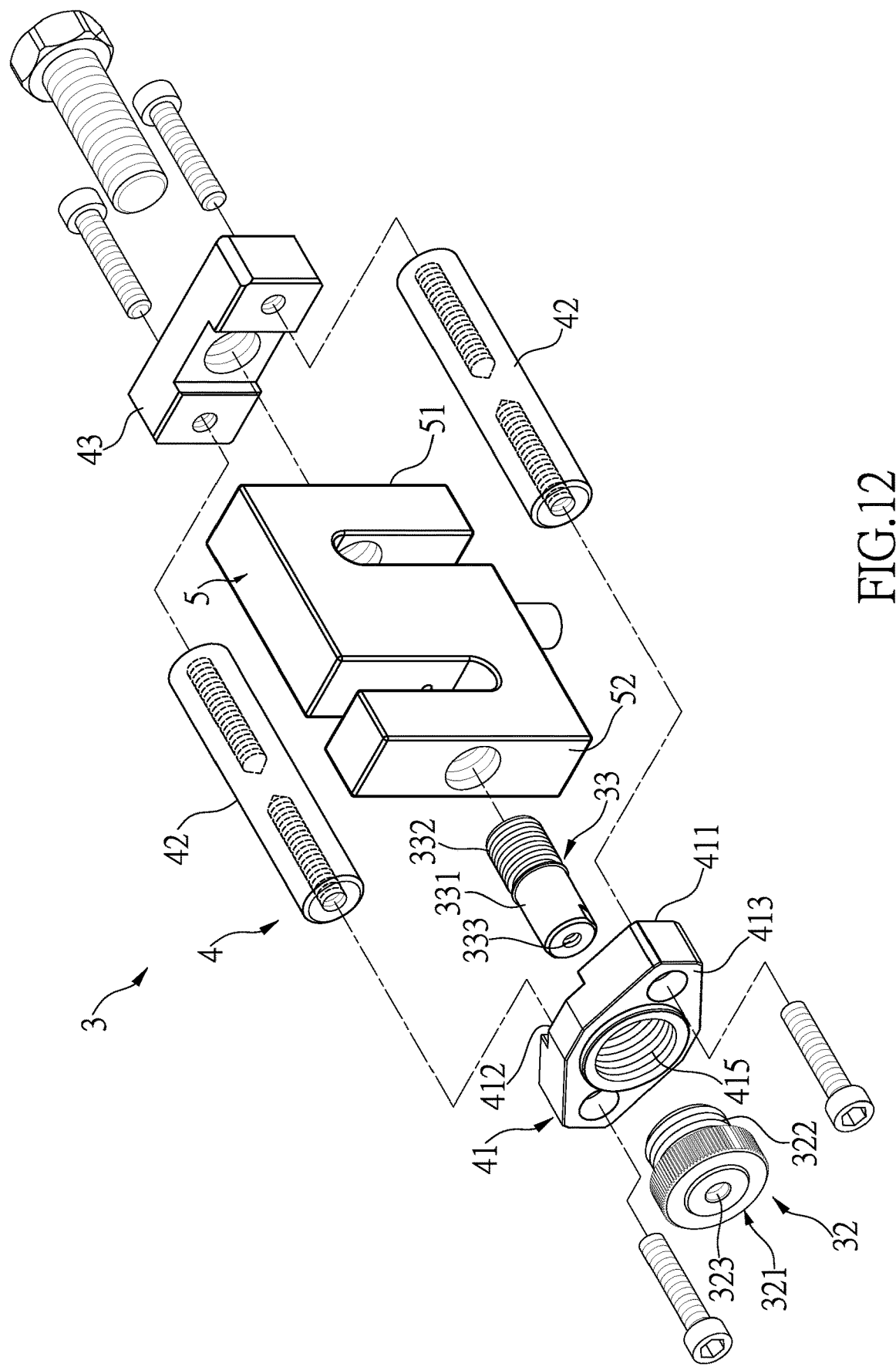
FIG. 12 is an exploded view of a pull-force detector according to the present invention.

As shown in FIG. 10, the first display area 60 is touch-controlled, so the first display area 60 can be touched to switch the currently-displayed waveform data unit 61 to one of Kgf, Lbf and N; with this configuration, the operator can quickly switch the waveform data unit 61 to a customary one.

Figure 2:
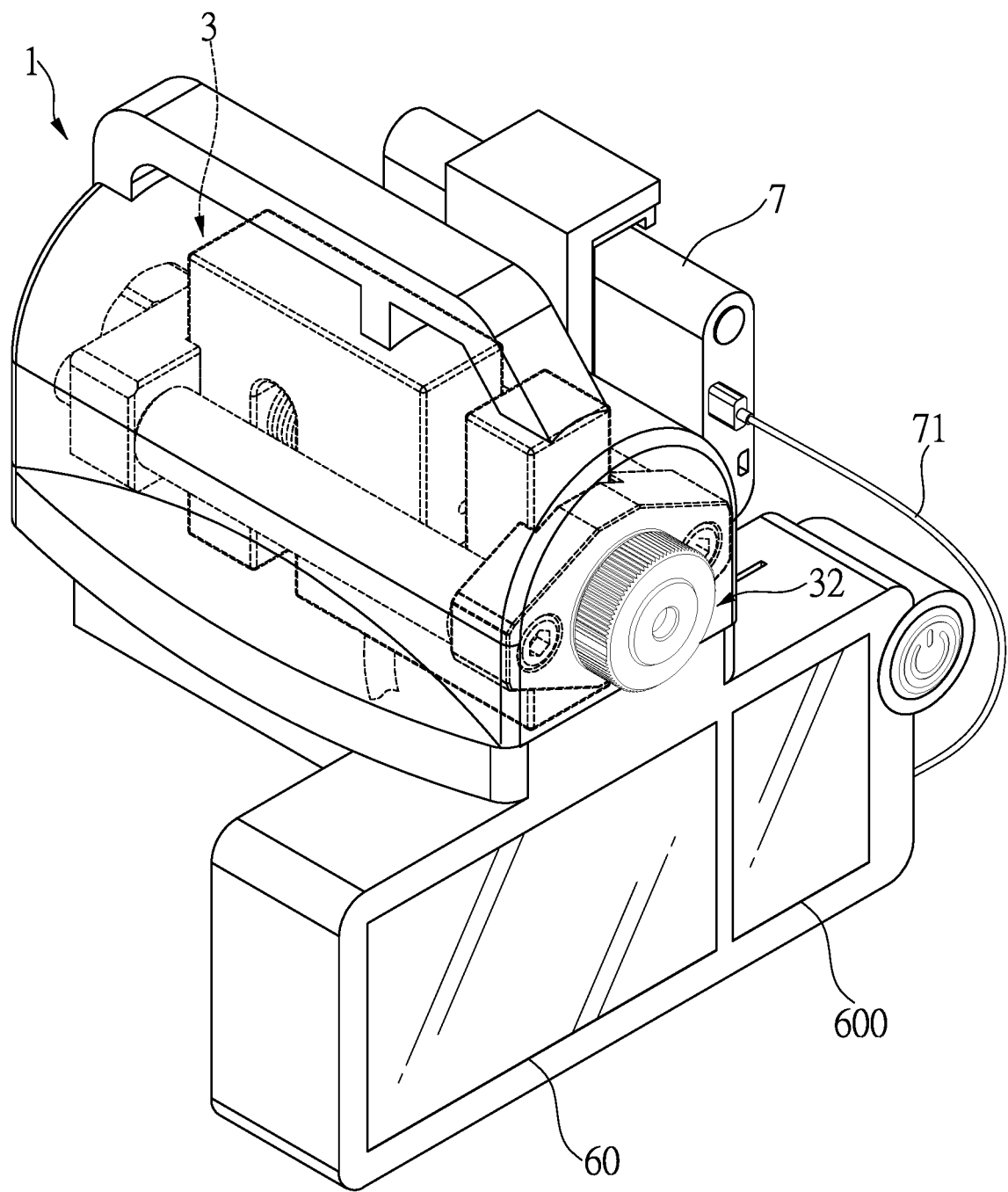
FIG. 2 is a perspective view of a test instrument according to the present invention.
Figure 16:
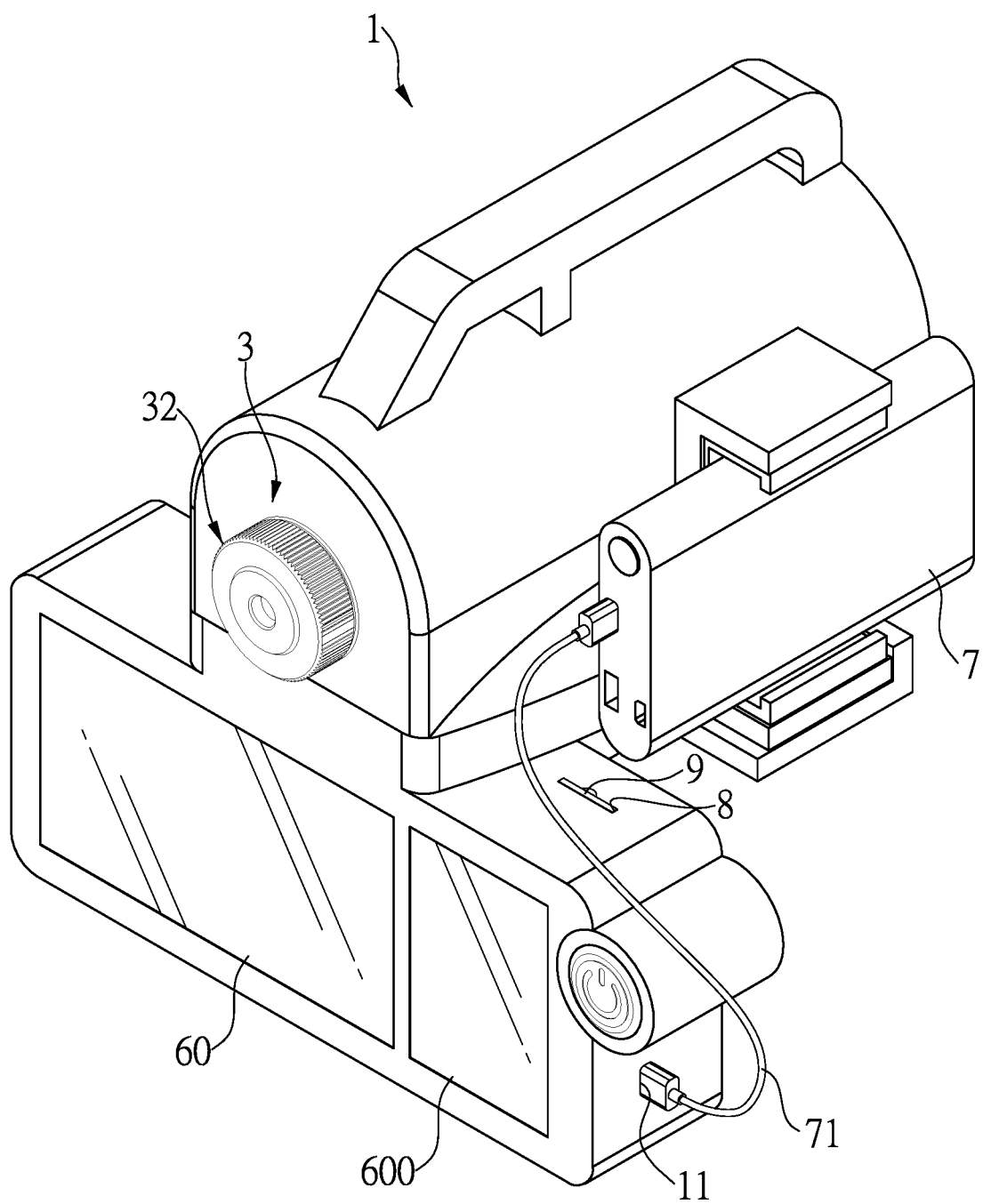
FIG. 16 is a perspective view of a test instrument of the present invention, when viewed from another angle.

Please refer to FIGS. 2 and 16, the test instrument can include a mobile power supply 7 disposed on the shell body 1 and electrically connected to the circuit module 2. The test instrument can also include a power supply port 11 disposed on the shell body 1 and electrically connected to the circuit module 2. The mobile power supply 7 is electrically connected to the circuit module 2 through a power line 71 and the power supply port 11, and configured to provide electrical power to the circuit module 2; with this configuration, the test instrument of the present invention can be carried easily and be used even in environment without power outlet.

Figure 17:
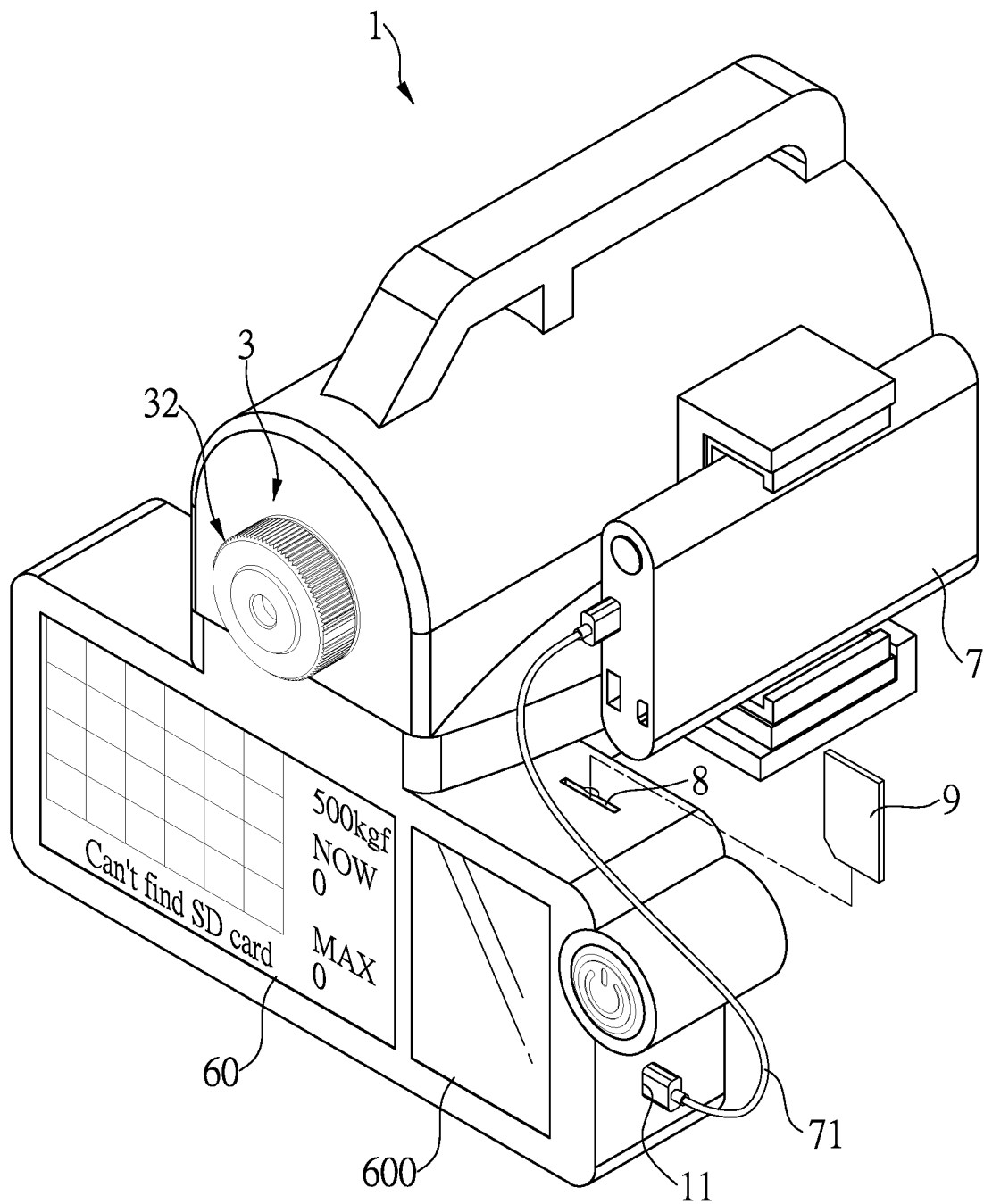
FIG. 17 is schematic view of an operation of removing a memory card from a memory card slot, according to the present invention.

Please refer to FIG. 17, the test instrument can include a memory card slot 8 disposed on the shell body 1 and electrically connected to the circuit module 2, and a memory card 9 removably inserted into the memory card slot 8 and configured to record the measure data. When no memory card 9 is inserted into the memory card slot 8, the first display area 60 displays a prompt text, so as to conveniently store the measured data including values and full waveform curve; furthermore, the prompt text can indicate that the memory card 9 is not inserted into the memory card slot 8, to remind a user that no memory card 9 inserted into the memory card slot 8.

As shown in FIGS. 11 to 15, the strain gauge 3 includes a support assembly 4, a strain measuring unit 5, a support member 32 and a pull pin 33. The support assembly 4 includes a head support 41, a plurality of lateral rods 42, and a tail support 43. Two ends of the plurality of lateral rod 42 are respectively connected to the head support 41 and the tail support 43, and around to form an accommodation area 44. Two ends of the strain measuring unit 5 serve as a fastening end 51 and a force receiving end 52, respectively, and the strain measuring unit 5 is disposed in the accommodation area 44 and the fastening end 51 is fastened with the tail support 43, and a gap is formed between the force receiving end 52 and the head support 41. The head support 41 has an inner side 411 and a support side 413, and the inner side 411 fasces toward the strain measuring unit 5. The head support 41 has a fastening hole 415 in communication with the inner side 411 and the support side 413, and the support member 32 includes a support part 321 and a connection part 322 connected to each other, the connection part 322 is connected to the fastening hole 415, the support part 321 is disposed on the support side 413, and the support member 32 has a through hole 323 in communication with the support part 321 and the connection part 322. The pull pin 33 includes a pin part 331 and a pin connection part 332 connected to each other, the pin connection part 332 is connected to the force receiving end 52, the pin part 331 is movably inserted into the through hole 323, the pin part 331 has a connection hole 333 in communication with the pin part 331 and the pin connection part 332, and configured to mount with the rivet nut setting tool 100. When being forced, the pull pin 33 pulls the strain measuring unit 5 to move toward the head support 4 and deform, and it causes reduction of the gap between the force receiving end 52 and the head support 41, and the pin part 331 is movable in the through hole 323.

The strain measuring unit 5 can be a strain gauge unit or a load cell; and in this embodiment, an S-type Strain gauge load cell is taken as an example of the strain measuring unit 5.

Figure 13:
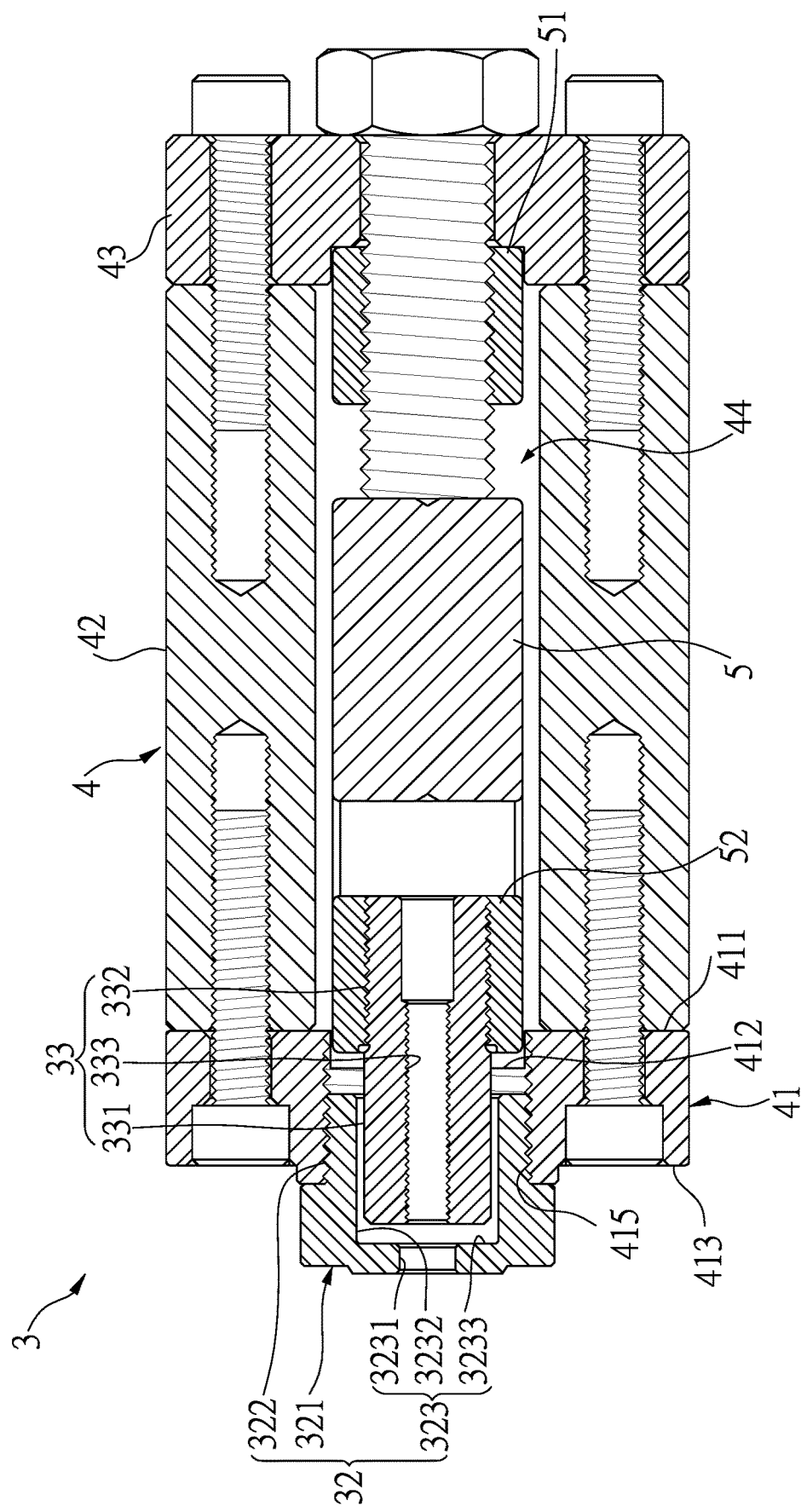
FIG. 13 is a sectional view taken along XIII-XIII of FIG. 11.
Figure 14:
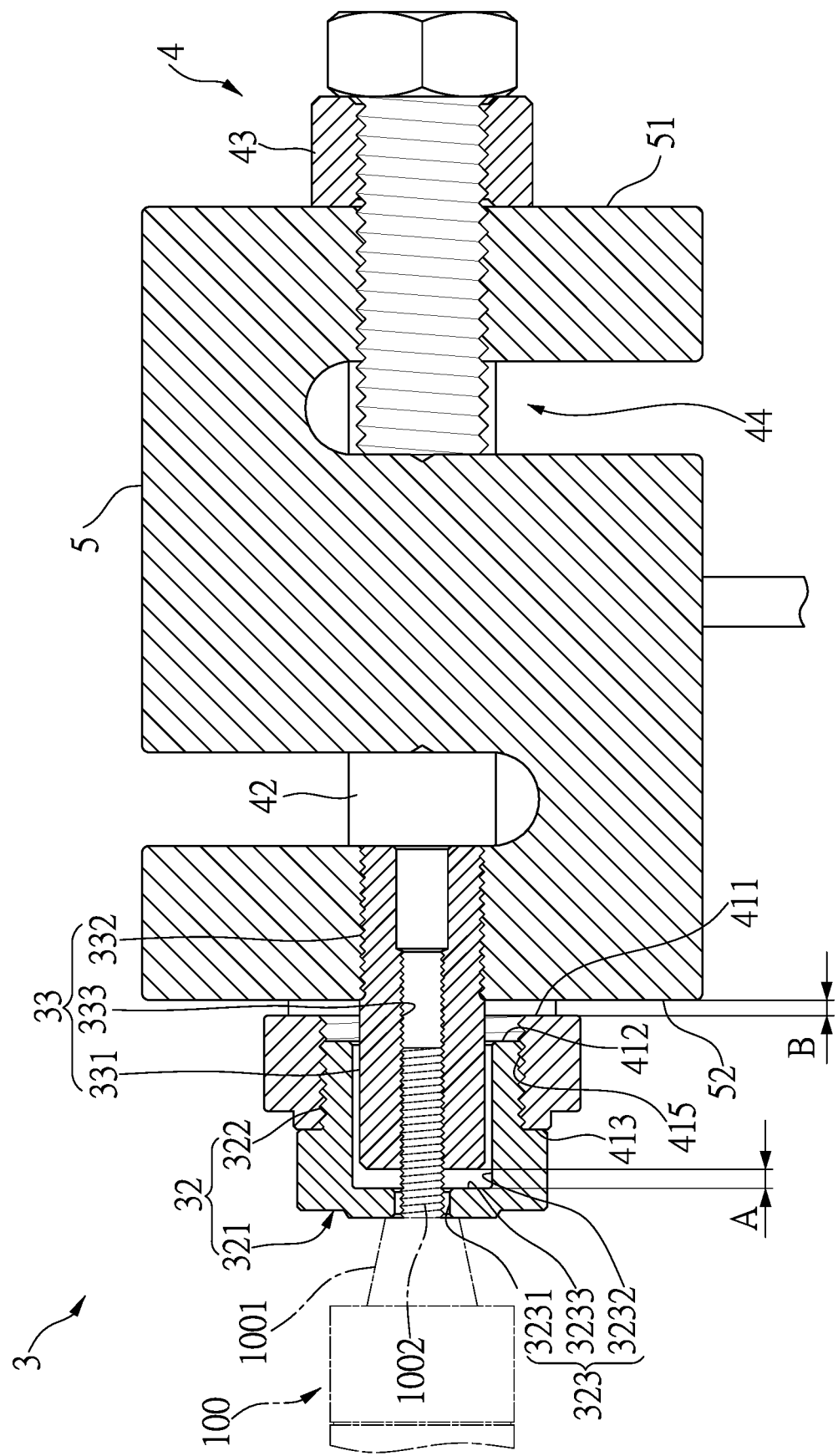
FIG. 14 is a sectional view taken along XIV-XIV of FIG. 11.
Figure 15:
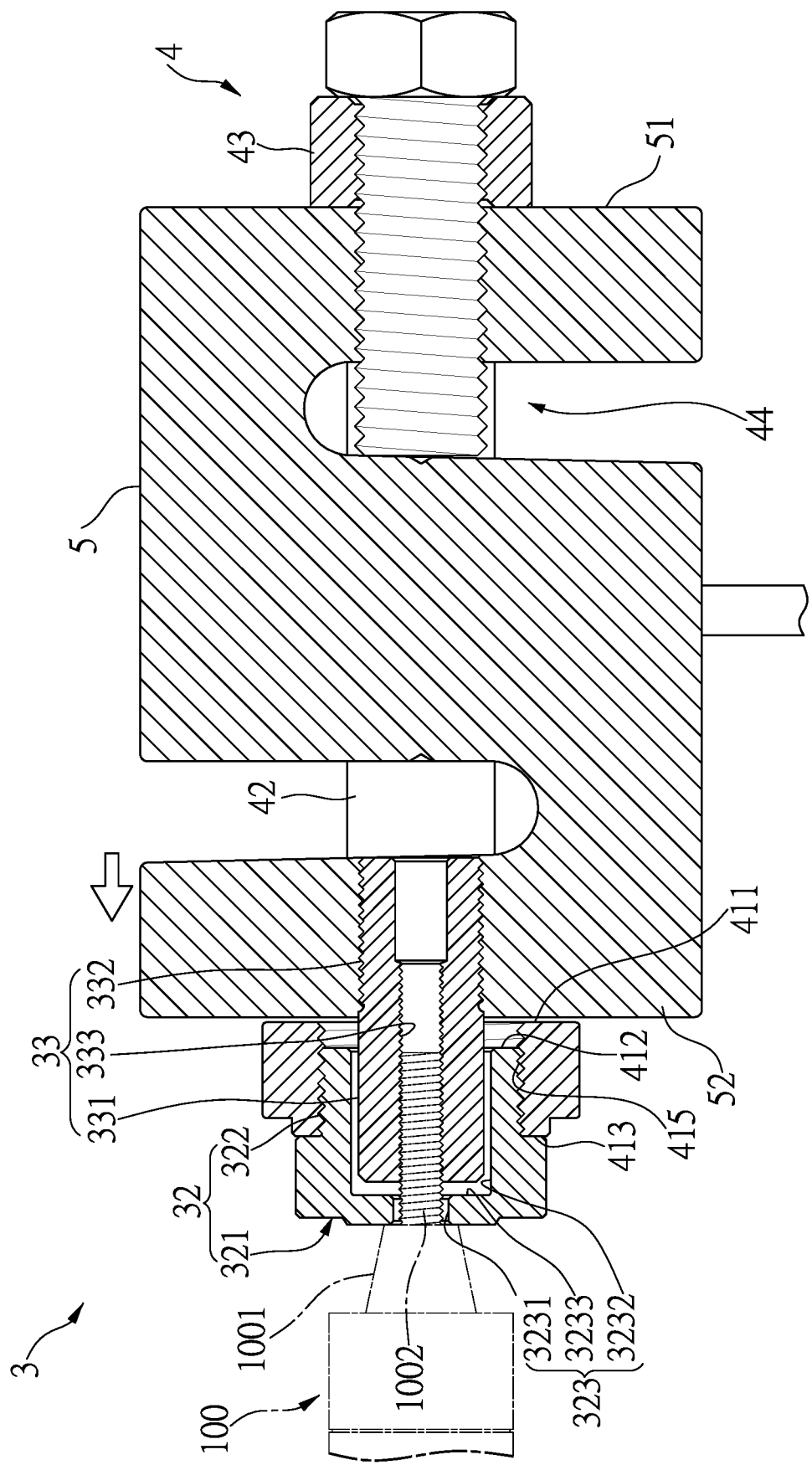
FIG. 15 is a schematic view of an operation of forcing a pull pin to pull and deform the strain measuring unit, according to FIG. 14.

The embodiment of the strain gauge 3 will be described in detail. As shown in FIGS. 13 and 14, the connection hole 333 of the pull pin 33 is configured to connect to the bolt 1002 of the rivet nut setting tool 100, the support member 32 is configured to support the counter force generated by the main body 1001 during operation of the rivet nut setting tool 100, as shown in FIG. 15, and the pull pin 33 is pulled toward the rivet nut setting tool 100 because of thread; since the fastening end 51 of the strain measuring unit 5 is fastened on the tail support 43 and the force receiving end 52 is connected to the pull pin 33, the pull pin 33 pulls the strain measuring unit 5 to deform when being moved, to the signal transmitted to the circuit module 2 is changed.

As shown in FIGS. 11 to 15, the head support 41 has an activity groove 412 recessed on the inner side 411 of the head support 41, a part of the force receiving end 52 is disposed in the activity groove 412, and a gap is formed between the force receiving end 52 and the groove bottom of the activity groove 412. The activity groove 412 provides a sufficient space for each deformation of the force receiving end 52, so as to prevent the variation of the detected data from being stopped because the strain measuring unit 5 is blocked by the head support to stop deformation; as a result, the measured maximum value can be increased.

As shown in FIG. 14, the through hole 323 has a narrow-diameter section 3231 and a wide-diameter section 3232 connected to each other, the pin part 331 is movably inserted into the wide-diameter section 3232, the through hole 323 has a drop surface 3233 formed on an end, in communication with the narrow-diameter section 3231, of the wide-diameter section 3232, and the drop surface 3233 is connected to the narrow-diameter section 3231, a distance A is formed between the pin part 331 and the drop surface 3233, a distance B is formed between the force receiving end 52 and the head support 41, and each of the distance A and the distance B is higher than a maximum deformation distance of the strain measuring unit 5; for example, in general, a deformation distance of the strain gauge load cell is lower than 0.5 mm, and it is assumed that each of the distance A and the distance B exceeds 2 mm, so the force receiving end 52 does not contact the head support 41 and the pin part 331 also does not contact the drop surface 3233 even if the strain measuring unit 5 is pulled to the maximum withstand value, thereby preventing the deformation of the strain measuring unit 5 from being blocked.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A data display method of a test instrument for a rivet nut setting tool, wherein the test instrument comprises a shell body, a pull-force detector, a circuit module, a first display area and a second display area, and the pull-force detector, the circuit module, the first display area and the second display area are disposed in the shell body, and the pull-force detector, the first display area and the second display area are electrically connected to the circuit module, and the rivet nut setting tool is disposed on the pull-force detector, and the data display method comprises:

when the rivet nut setting tool is operated, integrating a value of a pull force detected by the pull-force detector, and transmitting the integrated value to the first display area by the circuit module;

displaying, on the first display area, variation of the value of the pull force detected by the pull-force detector in waveform;

displaying, on the first display area, an upper-limit waveform value, a waveform data unit, a current value and a historical maximum value; and when the rivet nut setting tool is continuously operated, displaying a continuous waveform curve on the first display area, and displaying historical data and an average value of maximum pull force values on the second display area during operations of the rivet nut setting tool, sequentially.

2. The data display method according to claim 1, wherein during operation of the rivet nut setting tool, when the value of the pull force generated by the pull-force detector and integrated by the circuit module exceeds the upper-limit waveform value currently displayed on the first display area, the circuit module changes the upper-limit waveform value currently displayed on the first display area, to make the first display area display the full waveform curve.

3. The data display method according to claim 1, wherein the first display area is touch-controlled, and the first display area is touched to switch the currently-displayed waveform data unit to one of Kgf, Lbf and N.

4. The data display method according to claim 1, wherein the test instrument further comprises a mobile power supply disposed on the shell body and electrically connected to the circuit module.

5. The data display method according to claim 1, wherein the test instrument further comprises a memory card slot and a memory card, and the memory card slot is disposed on the shell body and electrically connected to the circuit module, and the memory card is removably inserted into the memory card slot and configured to record the measured data and the waveform curve, and when no memory card is inserted into the memory card slot, the first display area displays a prompt text.

6. The data display method according to claim 1, wherein the pull-force detector comprises a support assembly, a strain measuring unit, a support member and a pull pin, the support assembly comprises a head support, a plurality of lateral rods, and a tail support, two ends of the plurality of lateral rod are respectively connected to the head support and the tail support, and around to form an accommodation area, and two ends of the strain measuring unit serve as a fastening end and a force receiving end, respectively, the strain measuring unit is disposed in the accommodation area and the fastening end is fastened with the tail support, and a gap is formed between the force receiving end and the head support, the head support has an inner side and a support side, the inner side faces toward the strain measuring unit, the head support has a fastening hole in communication with the inner side and the support side, the support member comprises a support part and a connection part connected to each other, the connection part is connected in the fastening hole, the support part is disposed on the support side, and the support member has a through hole in communication with the support part and the connection part, the pull pin comprises a pin part and a pin connection part connected to each other, the pin connection part is connected to the force receiving end, the pin part is movably inserted into the through hole, the pin part has a connection hole in communication with the pin part and the pin connection part, the connection hole is configured to mount with the rivet nut setting tool, the pull pin pulls the strain measuring unit to deform when subject to a pull force, to reduce the gap between the force receiving end and the head support, and the pin part is movable in the through hole.

7. The data display method according to claim 6, wherein the head support has an activity groove recessed on the inner side, a part of the force receiving end is disposed in the activity groove, and the gap is formed between the force receiving end and a groove bottom of the activity groove.

8. The data display method according to claim 7, wherein the through hole comprises a narrow-diameter section and a wide-diameter section connected to each other, the through hole has a drop surface formed on an end, in communication with the narrow-diameter section, of the wide-diameter section, the drop surface is connected to the narrow-diameter section, a distance A is formed between the pin part and the drop surface, a distance B is formed between the force receiving end and the head support, and each of the distance A and the distance B is higher than a maximum deformation distance of the strain measuring unit.

\* \* \* \* \*